US007020637B2

(12) United States Patent
Bratton (10) Patent No.: US 7,020,637 B2
(45) Date of Patent: Mar. 28, 2006

(54) DIGITAL AUDIO AND VIDEO PLAYBACK WITH PERFORMANCE COMPLEMENT TESTING

(76) Inventor: Timothy Robert Bratton, 101 First St. PMB 549, Los Altos, CA (US) 94022

( * ) Notice: Subject to any disclaimer, the term of this patent is extended or adjusted under 35 U.S.C. 154(b) by 205 days.

(21) Appl. No.: 10/335,041

(22) Filed: Dec. 30, 2002

(65) Prior Publication Data

US 2003/0105678 A1 Jun. 5, 2003

Related U.S. Application Data

(63) Continuation of application No. 09/488,047, filed on Jan. 20, 2000, now Pat. No. 6,611,813.
(60) Provisional application No. 60/116,906, filed on Jan. 22, 1999.

(51) Int. Cl.
*G06F 17/00* (2006.01)

(52) U.S. Cl. ........................................................ 705/52
(58) Field of Classification Search .................. 705/52, 705/44, 35, 14, 26; 380/277
See application file for complete search history.

(56) References Cited

U.S. PATENT DOCUMENTS 6,006,257 A * 12/1999 Slezak .......................... 709/219
6,202,056 B1 * 3/2001 Nuttall .......................... 705/52

* cited by examiner

*Primary Examiner*—Pierre E. Elisca (57) ABSTRACT

System and method for monitoring and modifying a playlist of viewable audio and/or video selections at one or more selected times to account for the effects of restrictions on the times, and number of times, a selection is viewed in an internet-based viewing system. The system implements, and monitors compliance with, the performance complement requirements and other copyright restrictions. A selection can be viewed in association with one or more selected advertisements, with limited restrictions or no restrictions on viewing times. Priority advertisements, related to the date and/or to the time of day and/or to payment amount, are given preference. A license, paid for to view a selection, may have unlimited duration or may be limited in time.

46 Claims, 6 Drawing Sheets

| a v r f | a r s f | t f | s r | license rate | license duration | license payment recipient | encryption key |

DIGITAL AUDIO AND VIDEO PLAYBACK WITH PERFORMANCE COMPLEMENT TESTING

This application is a continuation of application Ser. No. 09/488,047, now U.S. Pat. No. 6,611,813 entitled "Digital Audio and Video Playback With Performance Complement Testing", filed Jan. 20, 2000, which claims the benefit under 35 U.S.C. § 119(e) of U.S. Provisional Application No. 60/116,906, filed Jan. 22, 1999. The above applications are incorporated by reference in their entirety.

FIELD OF THE INVENTION

This invention relates to digital audio and video playback, and more particularly to methods and apparatus that provide management of playlists for royalty bearing and non-royalty bearing viewable items and ensure compliance with the performance complement requirements.

BACKGROUND OF THE INVENTION

For convenient reference a "selection" will refer to an audio and/or video recording herein. Listening to and/or visually watching a selection is referred to collectively as "viewing" the selection. Copyright coverage of a viewable selection often requires payment of a royalty, or of a royalty-equivalent, when the selection is viewed more than a threshold number of times. A royalty-equivalent may be "paid" by viewing one or more commercial messages or advertisements at a time contemporaneous with viewing of the selection.

The Digital Millennium Copyright Act of 1998 ("Millennium Act") imposes additional requirements on a user who views, or offers viewing of, a sequence of two or more selections associated with a given recording, artist, artist group or anthology. One motivation for imposition of these additional requirements is to ensure that a given selection or artist does not become "shopworn" by reason of being viewed too often. The Millennium Act requirements are fairly complex and involve more than merely counting the number of times a particular selection is viewed in a commercial context.

What is needed is a system and associated method that facilitates compliance with the Millennium Act and facilitates viewing of royalty bearing and non-royalty bearing selections according to earlier provisions of copyright law. Preferably, the system should be flexible enough to allow quantitative and qualitative changes that reflect foreseeable changes in the applicable copyright law and should allow automation of a procedure for compliance with applicable copyright law.

SUMMARY OF THE INVENTION

These needs are met by the invention, which provides a system whereby a viewer or other consumer of audio and/or video selections ("user") manages one or more "playlists", defined as a menu of one or more program items, such as music selections, news stories, literary audio works and video works, that are viewable by the user. A connection is established between the user and a data network, such as the Internet, in which the user uses a computer equipped with a modem to interact with a network server to obtain program items and associated information.

Certain items in the viewer's playlist cannot be viewed more than a threshold number of times without violating certain performance requirements. The system provides a timer to control viewing and to ensure that a given item or related group of items is not viewed too often. One or more advertisements or other commercial messages is inserted in the program selections at selected times, or the viewer can choose commercial-free operation of the playback system.

The system allows some freedom on the part of the viewer but ensures that copyrights of the program material are not violated. The system distinguishes between a royalty bearing ("RB") program item, on which copyright requirements are imposed, and non-royalty bearing ("NRB") program items, on which time or viewing constraints are not normally imposed, and monitors viewing time for the RB items. By tracking each RB item viewed, the viewer will usually qualify for a reduced royalty rate. Typically, cumulative royalties paid to a licensing company, such as the American Society of Composers and Publishers (ASCAP) or Broadcast Music Institution (BMI) are higher if a blanket license is issued and the licensee is not required to account for each viewing of a performance. Herein, a "viewing" refers to a performance of part or all of an audio work or video work. The system will also track which songs or other selections a user views, how often each selection is viewed, and at what times and dates each selection is viewed.

One or more advertisements may be displayed in association with a playlist, and an ad may be given preference at certain times or dates, or because of the payment or payment-equivalent associated with viewing of the ad. One or more ads are displayed when a selected payment threshold is reached. Because some selections may accrue royalties at a higher rate than other selections, the system determines how often, and in what order, a sequence of advertisements is displayed in order to cover the royalties payable by reason of the user's viewing one or more selections.

This approach creates a content warehouse where a user can store an entire library of viewable selections. The user may have purchased a license to view some of these selections; viewing of other selections may require one or more royalty payments; and other selections may be viewable without charge. The user may choose to view commercial-supported selections (interspersed with advertisements) and/or may choose to view certain selections commercial-free. Commercial-free viewing is available (1) by limiting selections to those for which the user has purchased a license or which are designated as NRB by the publisher or copyright holder or (2) by making payment or payment-equivalent for the selections viewed. Then system also implements a sequence of tests, for each selection viewed, that ensure compliance with the performance complement provisions of the Millennium Act.

DESCRIPTION OF BEST MODE OF THE INVENTION

Figure 1A:
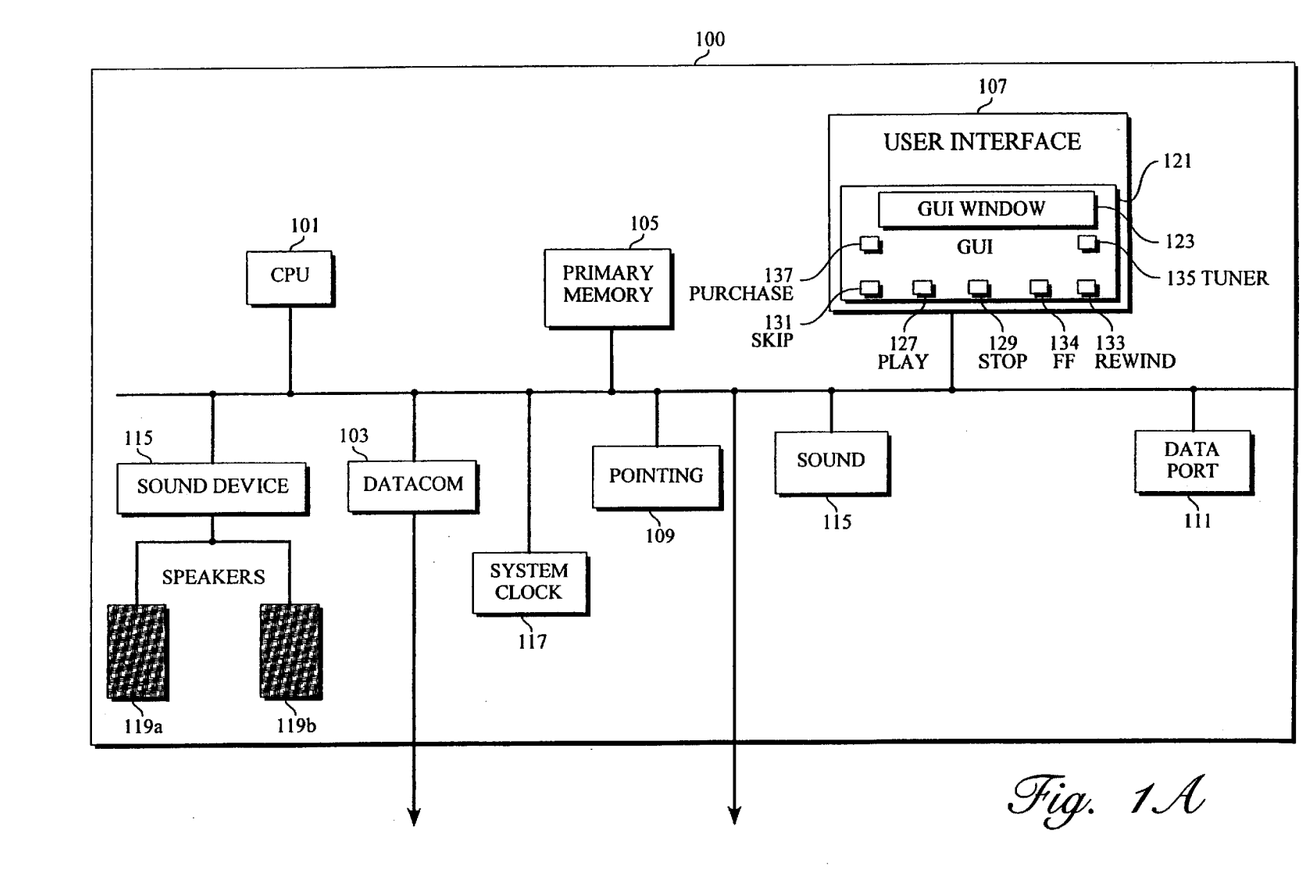
FIG. 1 illustrates a playback system to implement the invention.
Figure 1B:
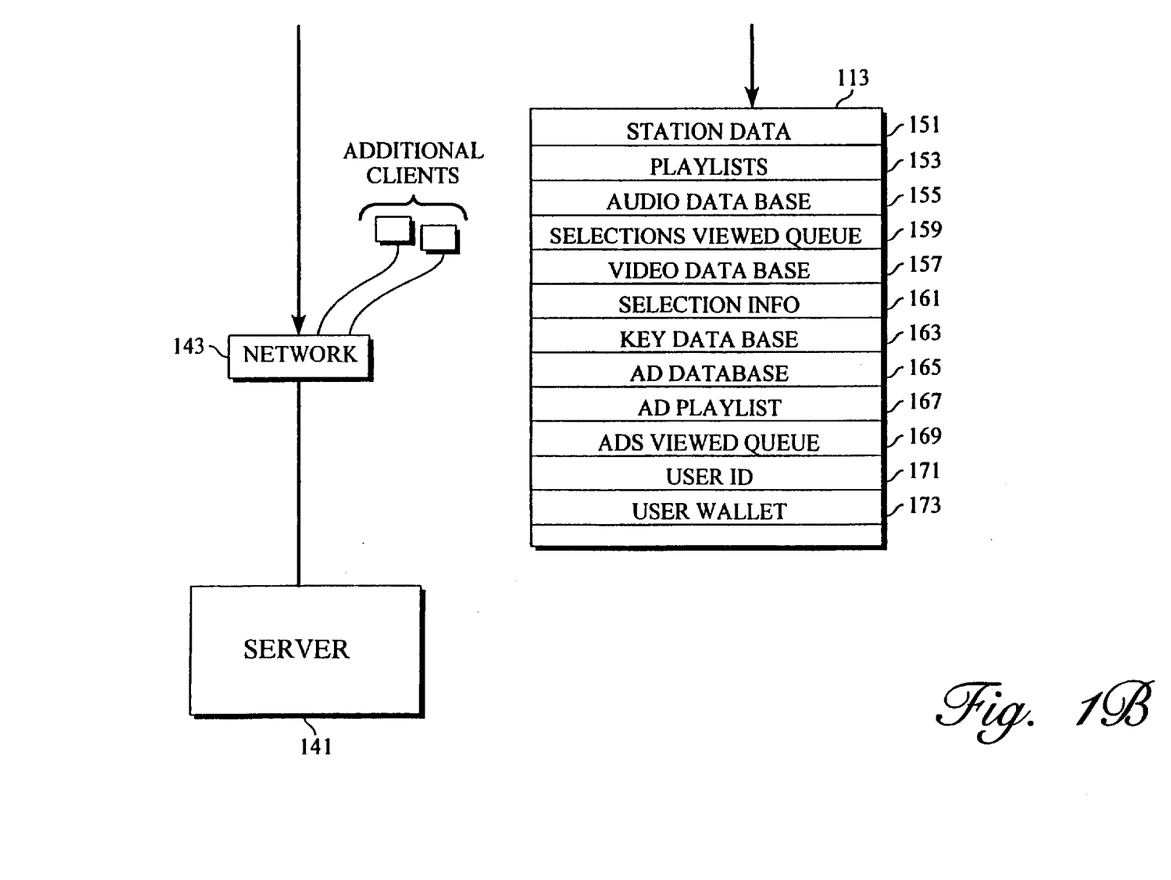

FIG. 1 is a schematic view of an embodiment of a system 100 for practicing the invention. The system 100 includes a CPU 101, a data communications interface 103 (e.g., a modem or Ethernet card), a primary memory 105 (e.g., fast access RAM), a user interface 107 (e.g., a CRT or LED display), a pointing device or indicator 109 (e.g., a mouse and key board, or a light pen), a data port 111 (e.g., a serial or parallel port or Universal Serial Bus), a secondary memory 113 (e.g., a hard disk), a sound device 115 (e.g., a sound card, Sound Blaster or audio chip), a system clock or timer 117 and one or more speakers 119a, 119b.

The user interface 107 includes a graphical user interface ("GUI") 121, a GUI window or display 123 and interface controls 125 that allow the viewer to control playback of the audio or video selection. The interface controls 125 include a selection play button 127, a stop button 129, a skip-to-next-selection button 131, a rewind button 133, a fast forward button 134, a tuner or scan button 135 and a purchase button 137.

The secondary memory 113 contains data that are downloaded from a server 141, associated with a selections warehouse 142 and operated in association with a communications network 143, such as the Internet, that is communicated with through the data interface 103. The secondary memory 113 optionally includes a source 151 for station data, a playlist database 153, an audio database 155, a video database 157, a selections viewed queue 159, a selection information database 161, a key database 163, an advertisement database 165, an advertisement playlist 167, an ads played queue 169, a user ID record 171 and/or a user payment source or "wallet" 173. The user ID record format includes a user ID field that uniquely identifies the user or viewer to the server 141 and optionally includes a public-private encryption key field, as illustrated in FIG. 2.

The station data source 151 in FIG. 1 contains information that describes or identifies each playlist in the playlist database 153. This playlist information is optionally displayed in the GUI window 123 when a specified selection or playlist is being viewed and is preferably presented to the user including a station name or station indicia and a short description of one or more selections in the playlist. Presentation of this information allows a user to identify a playlist and to refer to the playlist using the common metaphor of a radio station, if desired. By pressing or otherwise activating the scan button 135, the user can scan or step through all or a portion of the playlists included in the playlist database 153.

Figure 2:
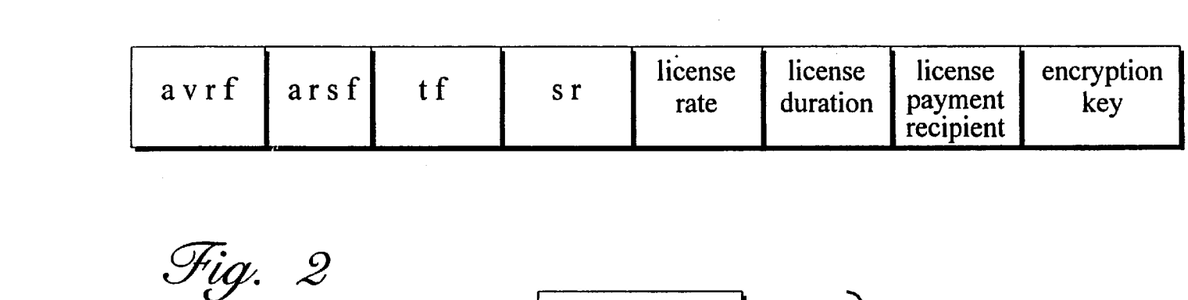
FIG. 2 illustrates a format of information fields used in practicing the invention.

The selection information database 161 contains information that identifies one or more selections, optionally including an audio/video record field ("avrf") that identifies the source (e.g., sound record, sound album, video record) in which the selection appears, an artist field ("af") that identifies an artist or group of artists featured in the selection, a title field ("tf") that identifies the title or name of the selection, as illustrated in FIG. 2. The selection information database 161 also includes an audio record set field ("arsf") that indicates if the selection is part of an audio record that is in turn part of an audio record set; and if so, an indicium identifying the audio record that is the source of the selection. For example, in an audio record set consisting of three audio records, arsf=i (i=1, 2, 3) for all selections taken from the audio record number i. A selection from a single audio record that is not part of an audio record set (two or more records) preferably corresponds to arsf=0. The selection information database 161 preferably contains a pointer to an encryption-decryption key in the key database 163 that may be used to decrypt a selection to be viewed.

The selection information database format illustrated in FIG. 2 also contains an RB/NRB field ("sr") that indicates if the selection is royalty bearing ("sr"=1) or non-royalty bearing ("sr"=0). Where sr=1, an associated field will include information on the royalty rate, a license duration (optional) and the recipient of the royalty payment(s). The user may convert a selection from RB to NRB by pressing or activating the purchase button 137; this action causes a (positive) monetary amount contained in the wallet 173 to be decremented by an appropriate amount, in payment of the specified royalty. If the wallet 173 contains insufficient funds to purchase a license to view an RB selection, the user is notified of this condition, preferably using the GUI window 123.

If payment of the royalty by the user provides a license to view of unlimited duration, the user may download the (now-NRB) selection to an NRB selection source, such as an MP3 disk, that can be viewed as often and for as long as the user wishes. If payment of the royalty by the user provides a license to view of limited time duration, a time stamp becomes associated with the selection. The user may download the selection plus time stamp to an NRB selection source that can be viewed as often as the user wishes, until the viewing system reads the time stamp and senses that the license time interval has run out. Beyond that time point, this downloaded selection cannot be viewed without making payment or payment-equivalent for another license to view this selection.

A user may make payment or payment-equivalent by presenting actual payment, using the purchase button or wallet 173 (FIG. 1), or by viewing one or more advertisements. Each ad has a payment-equivalent amount (e.g., $0.01 to $1.00) associated with viewing of the ad. Because the payment amount for viewing an ad is normally not uniform for all ads, the system optionally gives priority to certain ads over all other ads, based on the payment amount. For example, the system may give priority to the available ads with the highest associated payment-equivalent amount. The system may, alternatively, sense the present time and/or date and may give priority to certain ads associated with that time and/or date. For example, if the date sensed is early February, the system may give priority to ads associated with Valentine's Day activities; and if the time sensed is late afternoon, the system may give priority to ads directed to evening activities, such as restaurants and theaters. Further, the system operator may have agreed to present a given advertisement at least once but no more than N times (N≧1) in a given time interval, such as 24 hours or 7 days; a given ad may be given priority, or have priority and viewing availability withheld, based on the terms of this agreement.

A sound recording "performance complement" is introduced in the Digital Millennium Copyright Act of 1998 ("Millennium Act"), in order to limit the number of times a particular selection, artist or group of artists is viewed within a specified time interval. A viewing sequence of selections complies with the Millennium Act performance complement if, over a three-hour time interval: (i) no more than three selections from the same recording are viewed, (ii) no more than two consecutive selections from the same recording are viewed, (iii) no more than four selections from the same recording artist or artist group or anthology are viewed and (iv) no more than three consecutive selections from the same recording artist or artist group or anthology are viewed.

More generally, a viewing sequence of selections may be said to comply with a performance complement if, over a specified time interval of length $\Delta t(PC)$: (i) no more than a first specified number N1 of selections from the same recording are viewed; (ii) no more than a second specified number N2 of consecutive selections from the same recording are viewed; (iii) no more than a third specified number N3 of selections from the same recording artist or artist group or anthology are viewed; and (iv) no more than a fourth specified number N4 of consecutive selections from the same recording artist or artist group or anthology are viewed. An analogous performance complement may be applied to a sequence of video selections, such as a sequence of transmissions of television programs, or to the more familiar sequence of audio selections.

Figure 3:
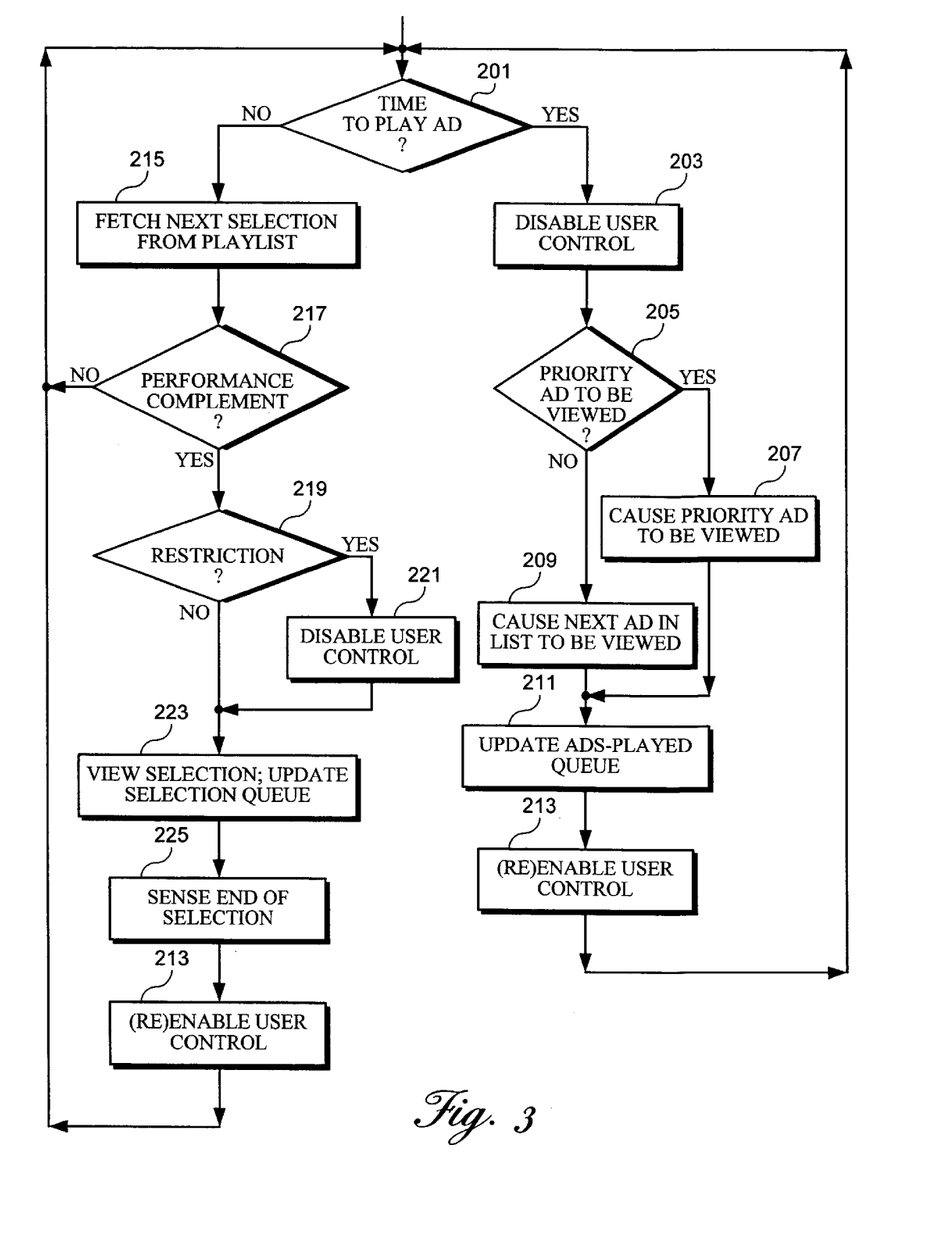
FIG. 3 is a flow chart illustrating a procedure for practicing the invention.

FIG. 3 is a flow chart of a procedure for practicing the invention. In step 201, the system checks the present time (and, optionally, the present date) and determines if a specified ad should be viewed at this time. If the answer to the query in step 201 is "yes", the system disables one or more user controls in step 203, and determines, in step 205, if the ad to be viewed is a priority ad. "User control" herein refers to one or more of the following activities: rewind of a tape or other selection; fast forward through, or skipping portions of, a tape or other selection; stopping or pausing during viewing of a selection; and any similar activity associated with viewing a selection.

If the answer to the query in step 205 is "yes", the system causes a priority ad to be viewed, in step 207, and moves to step 211. If the answer to the query in step 205 is "no", the system moves to step 209 and causes the next ad in a list to be viewed. In step 211, the system updates the ads-played queue by adding the ad just viewed to this queue. In step 213, the system (re)enables user control and recycles to step 201.

If the answer to the query in step 201 is "no", the system provides or examines the next selection from a playlist, in step 215. In step 217, the system determines if a performance complement applies to this next selection. If the answer to the query in step 217 is "no", the system recycles to step 201.

If the answer to the query in step 217 is "yes", the system determines if this nest selection is restricted, in step 219. If the answer to the query in step 219 is "yes", the system disables a user control (e.g., a selection rewind apparatus), in step 221, and moves to step 223. If the answer to the query in step 219 is "no", the system allows viewing of this next selection to begin, in step 223, and senses the end of this selection, in step 225. In step 227, the system (re)enables the user control and recycles to step 201.

Figure 4:
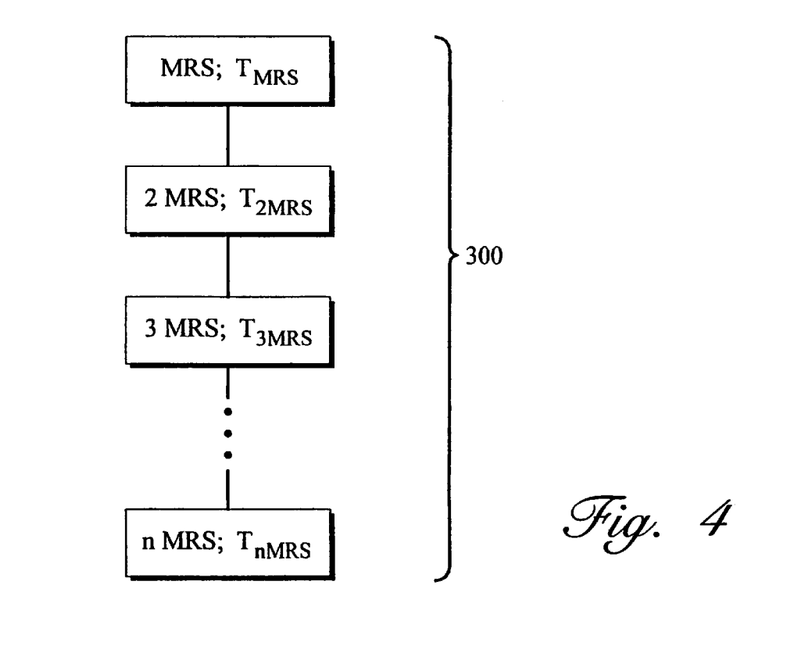
FIG. 4 illustrates a stack of selection labels, and associated time stamps, used to monitor compliance with the Millennium Act.

FIG. 4 is a diagram illustrating a structure of a selections-viewed queue, 300. When a selection is viewed, an identifying label or indicium for a selection, referred to as "SID", is created and used as a pointer to relevant information for that selection (module 109 in FIG. 1). The SID is pushed onto a stack and is given a time stamp. Each "SID" and associated time stamp, for a selection viewed within a specified time interval with a specified length $\Delta t(PC)$, is kept on the stack. A label for the selection that was viewed most recently, referred to as the "MRS" label, and its associated time stamp, referred to as "$T_{MRS}$", appear at the top of the stack. Optionally, the MRS label may include information on (i) the recording from which the selection is drawn and/or (ii) the artist or artist group featured in the selection.

Next in line in the stack queue are the labels 2MRS, 3MRS, 4MRS, etc., which refer to the selections viewed second-most recently, third-most recently, fourth-most recently, etc., each with its associated time stamp, $T_{nMRS}$ (n=2, 3, 4, . . . ). The system compares the selection information associated with each label to facilitate compliance with the (often complex) requirements of the Millennium Act. When a particular selection with label nMRS satisfies the condition $$T_{MRS} - T_{nMRS} \geq \Delta t(PC),$$

that particular selection label is removed from the bottom of the stack.

One result of this removal of the label nMRS from the stack is that the time at which this particular selection was last viewed is ignored. For example, the time interval length $\Delta t(PC)$ may be taken to be a time interval corresponding to one or more of the performance complement time intervals (e.g., $\Delta t(PC)$=3 hours), in order to account for the number of times a given selection is viewed within the performance complement time interval.

The system tests each selection to be viewed to verify that such viewing will not violate the copyright holder's rights according to the performance complement ("PC"). Before the next (chosen) selection is viewed, the selection (title), the selection, the recording of the selection, and the featured artist or artist group are subjected to four PC tests over a specified PC time interval: (i) no more than a first specified number N1 of selections from the same recording are viewed, (ii) no more than a second specified number N2 of consecutive selections from the same recording are viewed, (iii) no more than a third specified number N3 of selections from the same recording artist or artist group or anthology are viewed and (iv) no more than a fourth specified number N4 of consecutive selections from the same recording artist or artist group or anthology are viewed. Presently, N1=3, N2=2, N3=4 and N4=3, although these numbers may be changed by subsequent copyright legislation.

Figure 5A:
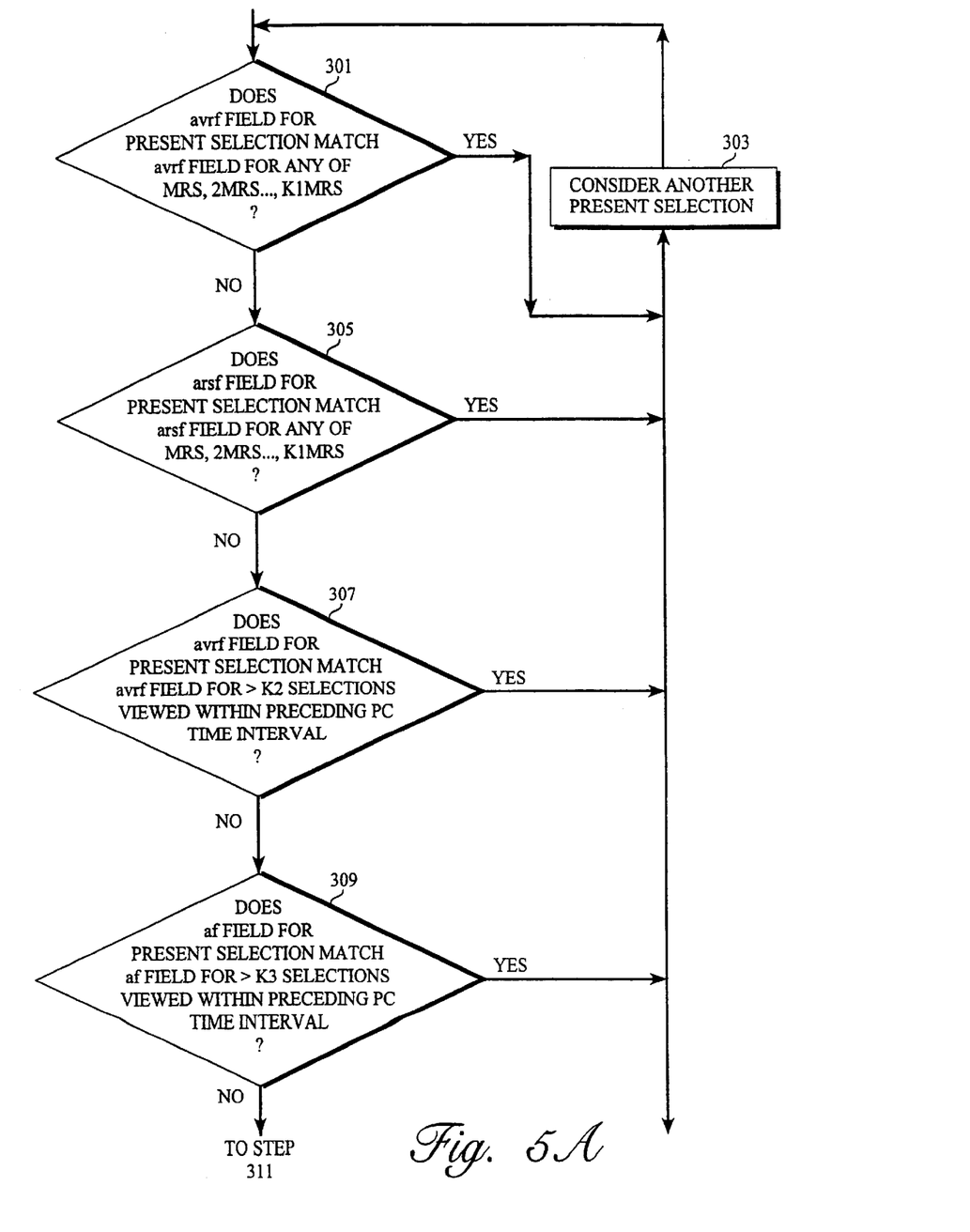
FIG. 5 is a flow chart illustrating a procedure for ensuring compliance with the Millennium Act.
Figure 5B:
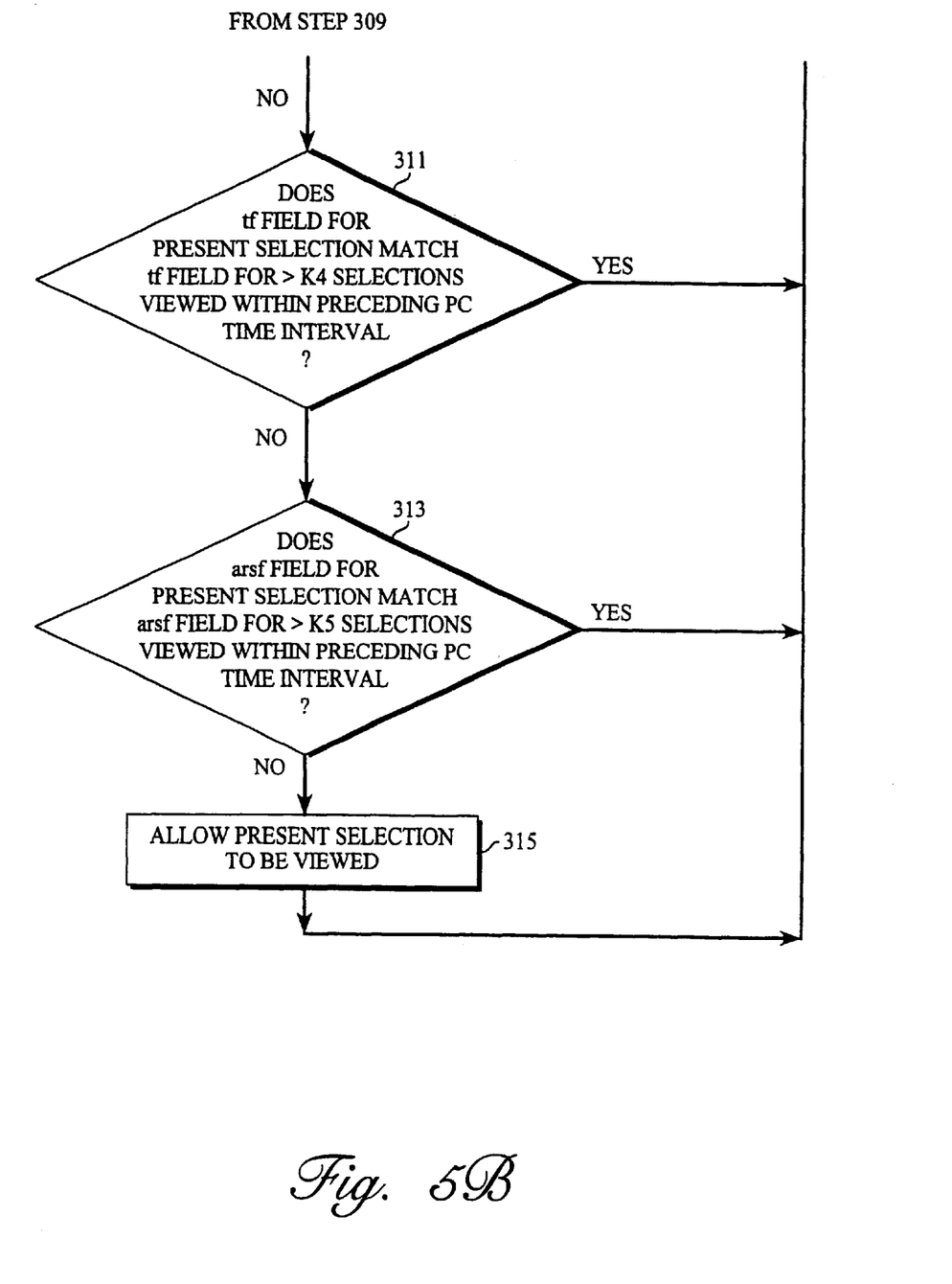

In one embodiment, illustrated in FIG. 5, the audio/video record field avrf and the audio record set field arsf for the selection under test are compared to the avrf and arsf fields for the selections with labels MRS, 2MRS . . . , K1MRS, in a first group of tests in steps 301 and 305. If a match occurs in any of these tests, the chosen selection cannot be viewed and the system tests the following selection in the playlist, in step 303.

If no match occurs, the system applies a second test, in step 307. The avrf field for the chosen selection is compared to the avrf field for each selection previously viewed during the PC time interval. If more than K2 matches occur, of the chosen selection avrf field with a previous selection 1° avrf field, the chosen selection cannot be viewed at this time, and the tests are applied to a following selection in the playlist.

If no more than K2 matches occur, of the chosen selection avrf field with a previous selection avrf field, a third test is applied, in step 309. The artist (and artist group) field af for the chosen selection is compared with the af field for each selection viewed within the preceding PC time interval. If more than K3 matches occur in the af field, the chosen selection cannot be viewed at this time, and the tests are applied to a following selection in the playlist.

If no more than three matches occur in the af field, the system applies a fourth test, in step 311. The title field tf for the chosen selection is compared to the title field tf of each selection viewed within the preceding PC time interval. If more than K4 matches occur, the chosen selection cannot be viewed at this time, and the tests are applied to a following selection in the playlist.

If no matches occur in the title field tf, the system applies a fifth test, in step 313, and compares the audio record set field arsf field of the chosen selection with the arsf field for each selection viewed within the preceding PC time interval. If more than K5 matches occur in the arsf field, the chosen selection cannot be viewed at this time, and the tests are applied to a following selection in the playlist. If no more than K5 matches occur in the arsf field, the system allows the chosen selection to be viewed, in step 315.

What is claimed is:

1. A method for monitoring viewing of a selection, the method comprising:
   receiving a request to view the selection, the selection stored in a local memory in an encrypted form;
   denying the request to view the selection if at least one of the following conditions has occurred:
   (1) a first condition in which at least a first predetermined number of selections from a recording that includes the selection have been viewed within a first selected time interval,
   (2) a second condition in which at least a second predetermined number of consecutive selections from the recording that includes the selection have been viewed within a second selected time interval,
   (3) a third condition in which at least a third predetermined number of selections from a recorded anthology that includes the selection have been viewed within a third selected time interval, or
   (4) a fourth condition in which at least a fourth predetermined number of consecutive selections from the recorded anthology that includes the selection have been viewed within a fourth selected time interval; and
   if not denying the request, allowing the selection to be viewed in an unencrypted form.

2. The method of claim 1, wherein the selection is viewed by transmitting the selection to a transducer, and wherein the selection is a music file.

3. The method of claim 1, wherein denying the request comprises disabling a user control for viewing the selection.

4. The method of claim 1, further comprising:
   determining if a performance complement is applicable to said selection.

5. The method of claim 1, further comprising:
   determining if said selection is restricted; and
   when said selection is restricted, determining if at least one of payment and payment-equivalent has been made for said viewing of said selection.

6. The method of claim 5, wherein, when at least one of said payment and said payment-equivalent has not been made for viewing of said selection, allowing payment-equivalent to be made by viewing a selected number of selected advertisements at approximately a time said selection is viewed.

7. The method of claim 5, further comprising:
   receiving said payment or said payment-equivalent for said viewing of said selection; and
   allowing subsequent viewing of said selection without restriction.

8. The method of claim 5, further comprising:
   receiving said payment or said payment-equivalent for said viewing of said selection; and
   allowing subsequent viewing of said selection only within a time interval determined with reference to a time said payment or said payment-equivalent is received.

9. The method of claim 1, further comprising:
   determining if said selection is restricted; and
   when said selection is not restricted, allowing said selection to be viewed.

10. The method of claim 1, further comprising choosing at least one of said first, second, third, and fourth selected time intervals to have a length of about three hours.

11. The method of claim 1, further comprising selecting at least one of the predetermined numbers as follows: selecting the first predetermined number to be 3, selecting the second predetermined number to be 2, selecting the third predetermined number to be 4, and selecting the fourth predetermined number to be 3.

12. The method of claim 1, further comprising:
    downloading the selection across a communications network from a server computer; and
    storing the selection in the local memory prior to receiving the request to view the selection.

13. The method of claim 1, further comprising:
    providing a playlist that includes at least the selection.

14. The method of claim 1, wherein viewing further comprises viewing an audio only selection.

15. A method for monitoring viewing of a selection at one or more selected times, the method comprising:
    providing a playlist including at least one selection that is chosen for viewing, wherein the at least one selection has an encrypted form;
    testing for at least one of the following conditions: (1) within a first selected time interval, at least M1 playlist selections from the same recording will have been viewed, if the selection is viewed; (2) within a second selected time interval, at least M2 consecutive selections from the same recording will have been viewed, if the selection is viewed; (3) within a third selected time interval, at least M3 selections from the same recorded anthology will have been viewed, if the selection is viewed; or (4) within a fourth selected time interval, at least M4 consecutive selections from the same recorded anthology will have been viewed, if the selection is viewed, where M1, M2, M3 and M4 are selected non-negative numbers; and
    when a tested for condition is present, declining to permit viewing of the selection within the corresponding first, second, third, or fourth time interval;
    otherwise, allowing the selection to be viewed in an unencrypted form.

16. The method of claim 15, wherein the selection is viewed by transmitting the ection to a transducer, and wherein the selection is a music file.

17. The method of claim 15, further comprising:
    receiving a user request to skip a currently viewed selection; and
    if a predetermined maximum number of skips have occurred, declining to permit skipping of the selection.

18. The method of claim 15, further comprising:
    receiving a user request to skip a currently viewed selection; and
    if a tested for condition is present, declining to permit skipping of the selection.

19. A method for monitoring viewing of selections, the method comprising:
    receiving a request to skip a currently viewed selection to view a next selection, the next selection stored in a local memory in an encrypted form;
    denying the request to skip the currently viewed selection if at least one of the following conditions has occurred:
    (1) a first condition in which at least a first predetermined number of selections from a recording that includes the next selection have been viewed within a first selected time interval,
    (2) a second condition in which at least a second predetermined number of consecutive selections from the recording that includes the next selection have been viewed within a second selected time interval, (3) a third condition in which at least a third predetermined number of selections from a recorded anthology that includes the next selection have been viewed within a third selected time interval, (4) a fourth condition in which at least a fourth predetermined number of consecutive selections from the recorded anthology that includes the next selection have been viewed within a fourth selected time interval, or (5) a fifth condition in which a fifth predetermined number of skips have occurred within a fifth selected time interval; and if not denying the request, skipping the currently viewed selection to allow the next selection to be viewed in an unencrypted form.

20. The method of claim 19, wherein the selection is viewed by converting the selection to sound, and wherein the selection is a music file.

21. The method of claim 19, wherein denying the request to skip comprises disabling a user control for viewing the selection.

22. A method for playing back a selection, the method comprising:

receiving a request to play the selection, the selection stored in a local memory in an encrypted form; and unencrypting the selection in response to the request to play the selection, unless at least one of the following conditions has occurred:

(1) a first condition in which at least a first predetermined number of selections from a recording that includes the selection have been played within a first selected time interval, (2) a second condition in which at least a second predetermined number of consecutive selections from the recording that includes the selection have been played within a second selected time interval, (3) a third condition in which at least a third predetermined number of selections from a recorded anthology that includes the selection have been played within a third selected time interval, or (4) a fourth condition in which at least a fourth predetermined number of consecutive selections from the recorded anthology that includes the selection have been played within a fourth selected time interval.

23. The method of claim 22, wherein the requested selection can be played by feeding the unencrypted selection to a speaker, and wherein the requested selection is a music file.

24. The method of claim 22, further comprising:

denying the request to play the selection when at least one of conditions (1) through (4) have occurred by disabling a user control for playing the selection.

25. A computer program product comprising a computer-readable medium containing computer program code for performing any one of the methods of claims 1 through 24.

26. A system for monitoring viewing of a selection, the system comprising:

a client computer that is programmed to test requests to view the selection, the selection stored in a local memory in an encrypted form, and to deny the request to-view the selection if at least one of the following conditions has occurred:

(1) a first condition in which at least a first predetermined number of selections from a recording that includes the selection have been viewed within a first selected time interval;

(2) a second condition in which at least a second predetermined number of consecutive selections from the recording that includes the selection have been viewed within a second selected time interval;

(3) a third condition in which at least a third predetermined number of selections from a recorded anthology that includes the selection have been viewed within a third selected time interval; or (4) a fourth condition in which at least a fourth predetermined number of consecutive selections from the recorded anthology that includes the selection have been viewed within a fourth selected time interval;

the client computer further programmed to allow the selection to be viewed in an unencrypted form if not denying the request.

27. The system of claim 26, wherein the requested selection is viewed by delivering said selection to an audio rendering device, and wherein said selection is a music file.

28. The system of claim 26, wherein denying the request comprises disabling a user control for viewing the selection.

29. The system of claim 26, wherein said client computer is further programmed to determine if a performance complement is applicable to said selection.

30. The system of claim 26, wherein said client computer is further programmed:

to determine if said selection is restricted; and when said selection is restricted, to determine if at least one of payment and payment-equivalent has been made for said viewing of said selection.

31. The system of claim 30, wherein said client computer is further programmed so that, when at least one of said payment and said payment-equivalent has not been made for viewing of said selection, the system allows payment-equivalent to be made by viewing a selected number of selected advertisements at approximately a time said selection is viewed.

32. The system of claim 30, wherein said client computer is further programmed:

to receive said payment or said payment-equivalent for said viewing of said selection; and to allow subsequent viewing of said selection without restriction.

33. The system of claim 30, wherein said client computer is further programmed:

to receive said payment or said payment-equivalent for said viewing of said selection; and to allow subsequent viewing of said selection only within a time interval determined with reference to a time said payment or said payment-equivalent is received.

34. The system of claim 30, wherein said client computer is further programmed:

to determine if said selection is restricted; and when said selection is not restricted, to allow said selection to be viewed.

35. The system of claim 30, wherein at least one of said first, second, third, and fourth selected time intervals has a length of about three hours.

36. The system of claim 30, wherein at least one of said predetermined numbers satisfies the following: the first predetermined number is 3, the second predetermined number is 2, the third predetermined number is 4, the fourth predetermined number is 3.

37. The system of claim 30, wherein the client computer is further programmed to download the selection across a communications network from a server computer and store the selection in the local memory.

38. The system of claim 26, further comprising:

a playlist that includes at least the selection.

39. The system of claim 26, wherein viewing comprises viewing an audio only selection.

40. A system for monitoring and modifying a playlist at one or more selected times, the system comprising:

a playlist including at least one viewable selection, wherein the at least one viewable selection has an encrypted form; and a computer that is programmed to:

test for at least one of the following conditions: (1) within a first selected time interval, at least M1 playlist selections from the same recording will have been viewed, if the selection is viewed; (2) within a second selected time interval, at least M2 consecutive selections from the same recording will have been viewed, if the selection is viewed; (3) within a third selected time interval, at least M3 selections from the same recorded anthology will have been viewed, if the selection is viewed; or (4) within a fourth selected time interval, at least M4 consecutive selections from the same recorded anthology will have been viewed, if the selection is viewed, where M1, M2, M3 and M4 are selected non-negative numbers;

when a tested for condition is present, decline to permit viewing of the selection within the corresponding first, second, third, or fourth time interval; and otherwise, allow the selection to be viewed in an unencrypted form.

41. The system of claim 40, wherein the requested selection is viewed by delivering said selection to an audio rendering device, and wherein said selection is a music file.

42. The system of claim 40, wherein the computer is further programmed to:

receive a user request to skip a currently viewed selection; and if a predetermined maximum number of skips have occurred, decline to permit skipping of the selection.

43. The system of claim 40, wherein the computer is further programmed to:

receive a user request to skip a currently viewed selection; and if a tested for condition is present, decline to permit skipping of the selection.

44. A system for monitoring viewing of selections, the system comprising:

a client computer that is programmed to test requests to skip a currently viewed selection to view a next selection, the next selection stored in a local memory in an encrypted form, and to deny the request to skip the currently viewed selection if at least one of the following conditions has occurred:

(1) a first condition in which at least a first predetermined number of selections from a recording that includes the next selection have been viewed within a first selected time interval, (2) a second condition in which at least a second predetermined number of consecutive selections from the recording that includes the next selection have been viewed within a second selected time interval;

(3) a third condition in which at least a third predetermined number of selections from a recorded anthology that includes the next selection have been viewed within a third selected time interval;

(4) a fourth condition in which at least a fourth predetermined number of consecutive selections from the recorded anthology that includes the next selection have been viewed within a fourth selected time interval; or (5) a fifth condition in which a fifth predetermined number of skips have occurred within a fifth selected time interval; and the client computer further programmed to skip the currently viewed selection to allow the next selection to be viewed in an unencrypted form if not denying the request.

45. The system of claim 44, wherein the selection is viewed by converting the selection to sound, and wherein the selection is a music file.

46. The system of claim 44, wherein denying the request to skip comprises disabling a user control for viewing the selection.

* * * * *